US007876715B1

(12) United States Patent
Jin et al.

(10) Patent No.: US 7,876,715 B1
(45) Date of Patent: Jan. 25, 2011

(54) BEAMFORMING MULTIPLE-INPUT MULTIPLE-OUTPUT WIRELESS TECHNIQUES USING SPATIAL DECOMPOSITION FOR FREQUENCY DIVISION DUPLEX SYSTEMS

(75) Inventors: Hang Jin, Plano, TX (US); Yanxin Na, Plano, TX (US); Li Guo, Irving, TX (US); John Grabner, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 169 days.

(21) Appl. No.: 12/204,867

(22) Filed: Sep. 5, 2008

(51) Int. Cl.
*H04B 7/005* (2006.01)
(52) U.S. Cl. .................. 370/278; 370/282; 370/334; 342/372; 342/377; 455/562.1
(58) Field of Classification Search ............ None
See application file for complete search history.

(56) References Cited

U.S. PATENT DOCUMENTS

| 6,694,155 | B1 | 2/2004 | Chin et al. ............... 455/562.1 |
| 2008/0043873 | A1* | 2/2008 | Ariyavisitakul ............ 375/267 |
| 2008/0075058 | A1* | 3/2008 | Mundarath et al. .......... 370/342 |
| 2009/0042618 | A1* | 2/2009 | Hedayat et al. ........... 455/562.1 |

FOREIGN PATENT DOCUMENTS

EP    1087545 A1    3/2001

WO    2008065462 A3    6/2008

OTHER PUBLICATIONS

Liang et al., "Downlink Beamforming for DS-CDMA Mobile Radio with Multimedia Services,"0 VTC, 1999, pp. 17-21.
Liang et al., "Downing Channel Covariance Matrix (DCCM) Estimation for FDD SDMA," VTC, 2001, pp. 2382-2386.

\* cited by examiner

*Primary Examiner*—Chi H. Pham
*Assistant Examiner*—Shick Hom
(74) *Attorney, Agent, or Firm*—Edell, Shapiro & Finnan, LLC (57) ABSTRACT

Techniques are provided herein to combine the advantages of beamforming with the advantages of multiple-input multiple output (MIMO) technology in a frequency division duplex (FDD) communication system, even when the uplink and downlink frequency separation exceeds the coherent bandwidth of the over-the-air-channels. At a first wireless communication device having M plurality of antennas, a wireless transmission is received that is sent from a second wireless communication device having P plurality of antennas. The first device computes spatial components associated with the transmission received at the M plurality of antennas. The first device selects the N strongest spatial components among the computed spatial components. The first device computes N beamforming weight vectors based on the N strongest spatial components. The first device then computes N MIMO beamforming weight vectors based on the N beamforming weight vectors. The N MIMO beamforming weight vectors are applied to N signal streams to be transmitted via the plurality of antennas of the first device to the plurality of antennas of the second device.

19 Claims, 5 Drawing Sheets

BEAMFORMING MULTIPLE-INPUT MULTIPLE-OUTPUT WIRELESS TECHNIQUES USING SPATIAL DECOMPOSITION FOR FREQUENCY DIVISION DUPLEX SYSTEMS

TECHNICAL FIELD

The present disclosure generally relates to estimating beamforming weights for use in wireless communication systems.

BACKGROUND

In wireless communication systems, antenna arrays are used at devices on one or both ends of a communication link to suppress multipath fading and interference, and to increase system capacity by supporting multiple users and/or higher data rate transmissions.

For example, in frequency division duplex (FDD) systems, a base station (BS) device and each of a plurality of mobile station (MS) devices are equipped with a plurality of antennas. In general, the BS device may be referred to as a first wireless communication device and an MS device may be referred to as a second wireless communication device, or vice versa. The term "downlink" is used herein to refer to a transmission from a BS device to an MS device, and the term "uplink" is used to refer to a transmission from an MS device to a BS device.

One advantage of systems in which a BS device and the MS device both have a plurality of antennas is that transmit signals can be beamformed from one device to the other. When beamforming is employed, each of the transmitters in one device transmits the same signal but with different amplitude and phase through the respective antennas to the other device. Beamformed signals improve the signal-to-noise ratio (SNR) at the receiving device by exploiting the multipath effects of the communication channel between the two devices.

Another advantage of systems in which a BS device and an MS device both have a plurality of antennas is that they can be configured for multiple-input multiple-output (MIMO) communication. Specifically, multiple signal streams may be simultaneously transmitted between devices configured for MIMO communication, thereby substantially increasing the data rate capacity of the system on a frequency channel. Thus, while beamforming involves transmitting the same signal via multiple antennas from one device to another device, MIMO communication involves transmitting multiple signal (data) streams via multiple antennas from one device to another device.

Combining beamforming and MIMO techniques (referred to herein as beamforming+MIMO) is seen as an attractive way to improve the capacity of a communication channel. An important aspect in the implementation of a system that combines beamforming and MIMO techniques is the computation of the weights that are applied to the signal streams to be transmitted from one device to another device. Knowledge of the channel conditions is needed to compute weights that will achieve a desirable reception quality of the signal streams at the destination device.

Generally, there are two types of schemes to obtain the channel information (conditions). One technique is referred to as a "closed-loop" technique whereby the destination device detects the channel information (e.g., downlink channel information where the destination device is an MS device) based on specifically designed downlink signals transmitted by the BS device and transmits a signal (as feedback) containing the channel information to the BS device. This requires processing on the MS device and additional overhead on the uplink channel. Another technique is referred to as channel sounding and which uses uplink signals received from an MS device at a BS device to estimate the spatial signature of the plurality of antennas of the BS device to the plurality of antennas of the MS device. Channel sounding is not an attractive option in FDD systems because the uplink and downlink signals are separated in frequency such that the downlink and uplink channels are uncorrelated.

A need exists to derive knowledge of a communication channel between a first device having a plurality of antennas and a second device having a plurality of antennas when the frequencies of the uplink and downlink are separated. Using this knowledge of the channel, more accurate values for beamforming weights can be computed for transmitting one or more signals from a plurality of antennas of the first device to a plurality of antennas of the second device, which is particularly desirable in an FDD communication system configured to use beamforming+MIMO techniques.

DESCRIPTION OF EXAMPLE EMBODIMENTS

Overview

At a first wireless communication device having M plurality of antennas, a wireless transmission is received that is sent from a second wireless communication device having P plurality of antennas. The first device computes spatial components associated with the transmission received at the M plurality of antennas. The first device selects the N strongest spatial components among the computed spatial components. The first device computes N beamforming weight vectors based on the N strongest spatial components. The first device then computes N MIMO beamforming weight vectors based on the N beamforming weight vectors. The N MIMO beamforming weight vectors are applied to N signal streams to be transmitted via the plurality of antennas of the first device to the plurality of antennas of the second device. The number of antennas, P, at the second device need not be equal to the number of signal streams, N.

Figure 1:
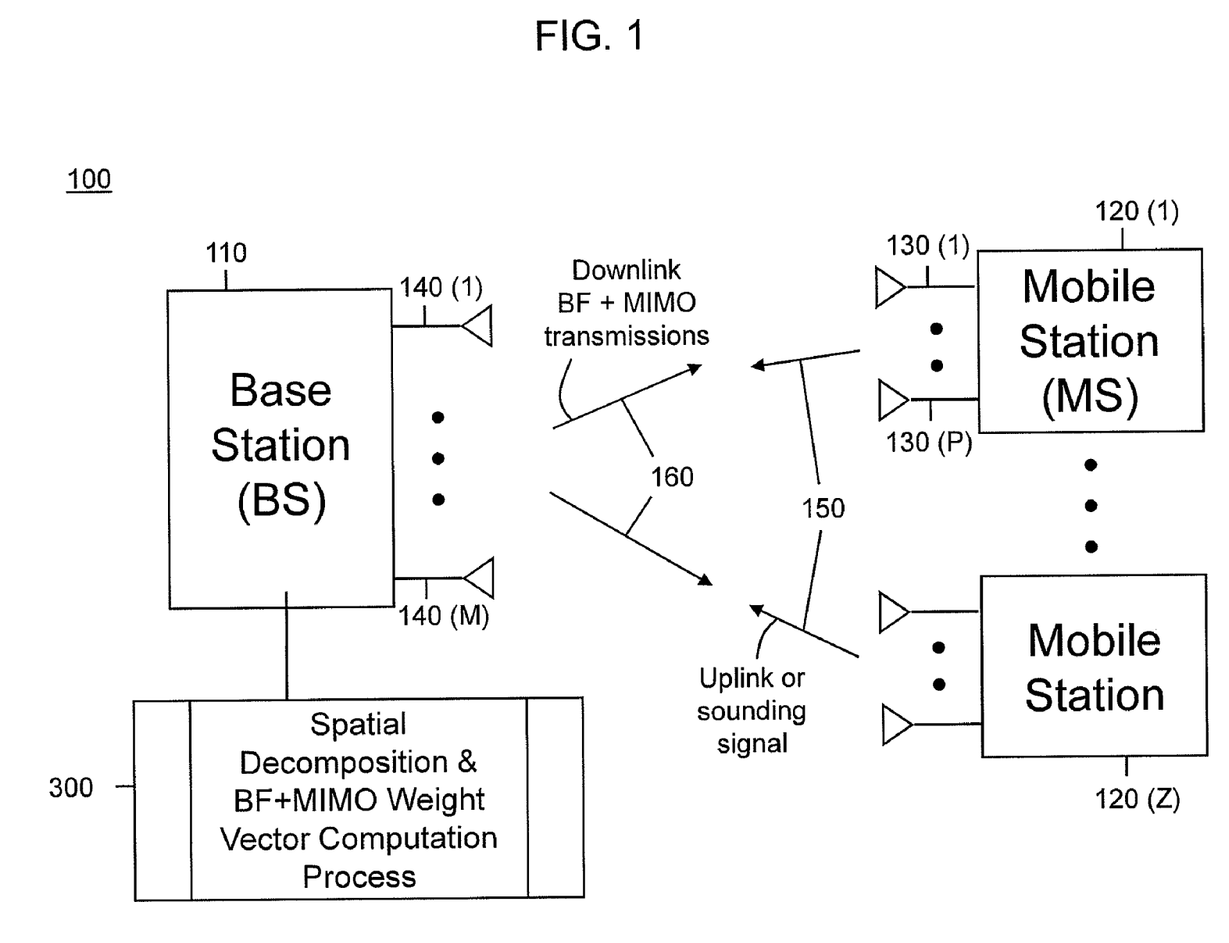
FIG. 1 is a block diagram showing an example of a MIMO wireless communication system in which at least one communication device is configured perform a spatial decomposition and beamforming+MIMO weight vector computation process.

Referring first to FIG. 1, a wireless radio communication system or network is shown generally at reference numeral 100 and comprises a first communication device, e.g., a base station (BS) 110, and a plurality of second communication devices, e.g., mobile stations (MS's) 120(1)-120(Z). The BS 110 may connect to other wired data network facilities (not shown) and in that sense serves as a gateway or access point through which the MS's 120(1)-120(Z) have access to those data network facilities.

The BS 110 comprises a first plurality of antennas 140(1)-140(M) and the MS's 120(1)-120(Z) comprise a second plurality of antennas 130(1)-130(P). The BS 110 may wirelessly communicate with individual ones of the MS's 120(1)-120(Z) using a wideband wireless communication protocol in which the bandwidth is much larger than the coherent frequency bandwidth. An example of such a wireless communication protocol is the IEEE 802.16 communication standard, also known commercially as WiMAX™. Each MS 120(1)-120(Z) may have a different antenna configuration (e.g., a different number of antennas). The system 100 may employ a single-carrier or a multi-carrier modulation format. One example of a multi-carrier modulation format is orthogonal frequency-division multiplexing/multiple-access (OFDM/OFDMA) technology.

The BS 110 performs various forms of beamforming when transmitting signal streams on the downlink channel to a particular MS, e.g., MS 120(1), based on the knowledge derived from signals that the BS 110 receives from the MS 120(1), even when the uplink signals shown at reference numeral 150 and downlink transmissions shown at reference numeral 160 are largely separated in frequency, e.g., when the frequency separation exceeds the coherent bandwidth of the over-the-air channel between the two devices. More specifically, the BS 110 is configured to derive knowledge of the spatial components of the downlink channel through a spatial decomposition and beamforming (BF)+MIMO weight vector computation process 300 based on received uplink signals 150 sent by MS 20(1) when generating the downlink transmissions 160.

FIG. 1 is illustrative more generally of a wireless communication link between two nodes or devices, where the first node or device is the BS 110 that has M antennas and the second node or device is an MS, e.g., MS 120(1) that has P (P≦M) antennas. In FDD systems, the spatial characteristics associated with the downlink channel may not correlate with the spatial characteristics associated with the uplink channel when the frequency separation exceeds the coherent bandwidth, as mentioned above. However, the spatial characteristics of the downlink channel can be derived by computing a direction of arrival of a received uplink signal 150 at each of the antennas of the first device using spatial decomposition techniques as described herein. The direction of arrival information at each of the M antennas 140(1)-140(M) can be used to compute beamforming weight vectors for beamforming multiple signals to the P antennas of the second device. Thus, each of the P antennas of the second device (MS 120(1)) can capture most if not all of the radio frequency energy to achieve significant beamforming gain. For simplicity, the terms BS and MS may be used hereinafter instead of first device and second device. However, it is understood that the techniques described herein are general and can be applied even if first node is not a BS and/or the second node is not an MS.

Figure 2:
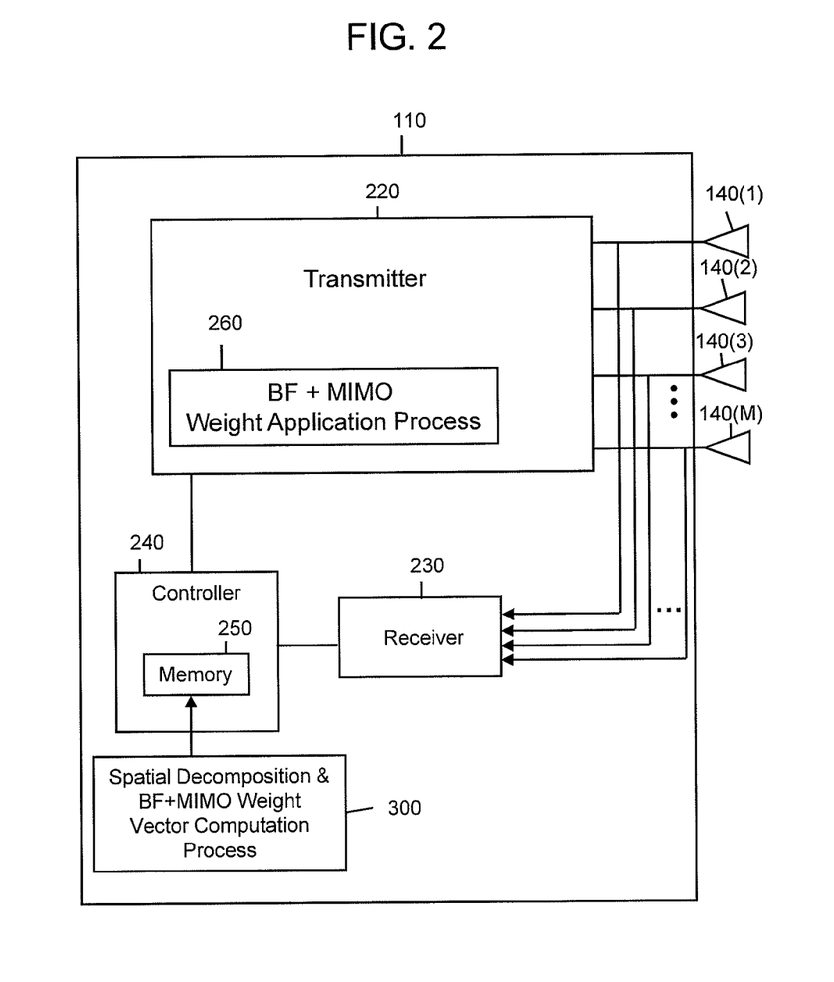
FIG. 2 is a block diagram of a communication device that is configured to perform the spatial decomposition and beamforming+MIMO weight vector computation process.

Turning to FIG. 2, an example block diagram of a BS 110 is now described. The BS 110 comprises a transmitter 220, receiver 230 and a controller 240. The controller 240 supplies data, obtained from higher control/transport layers in the device (not shown), to the transmitter 220 to be transmitted and processes signals received by the receiver 230. In addition, the controller 240 performs other transmit and receive control functionality. Part of the functions of the transmitter 220 and receiver 230 may be implemented in a modem and other parts of the transmitter 220 and receiver 230 may be implemented in radio transmitter and radio transceiver circuits. Likewise, the controller 240 may perform functions associated with a modem. It should be understood that there are analog-to-digital converters (ADCs) and digital-to-analog converters (DACs) in the various signal paths to convert between analog and digital signals.

The transmitter 220 comprises individual transmitter circuits that supply respective signals to corresponding ones of the antennas 140(1)-140(M) for transmission. The receiver 230 receives the signals detected by each of the antennas 140(1)-140(M) and supplies corresponding antenna-specific receive signals to the controller 240. It is understood that the receiver 230 comprises a plurality of receiver circuits, each for a corresponding one of the antennas 140(1) to 140(M). For simplicity, the individual receiver circuits and individual transmitter circuits are not shown.

The controller 240 comprises a memory 250 or other data storage block that stores data used for the techniques described herein. The memory 250 may be separate or part of the controller 240. Instructions for performing the spatial decomposition and BF+MIMO weight vector computation process 300 may be stored in the memory 250 for execution by the controller 240. The process 300 generates BF+MIMO weight vectors that are applied to respective signals to be transmitted in order to generate a plurality of weighted signals that are supplied to corresponding ones of the plurality of antennas 140(1)-140(M) for transmission.

The functions of the controller 240 may be implemented by logic encoded in one or more tangible media (e.g., embedded logic such as an application specific integrated circuit, digital signal processor instructions, software that is executed by a processor, etc.), wherein the memory 250 stores data used for the computations described herein (and/or to store software or processor instructions that are executed to carry out the computations described herein). Thus, the process 300 may be implemented with fixed logic or programmable logic (e.g., software/computer instructions executed by a processor). Moreover, a process for applying the BF+MIMO weight vectors to the transmit signals shown at 260 in the transmitter 220 may be performed by the same or different logic component that is used to perform the spatial decomposition and BF+MIMO weight vector computation process 300, e.g., the controller 240.

Figure 3:
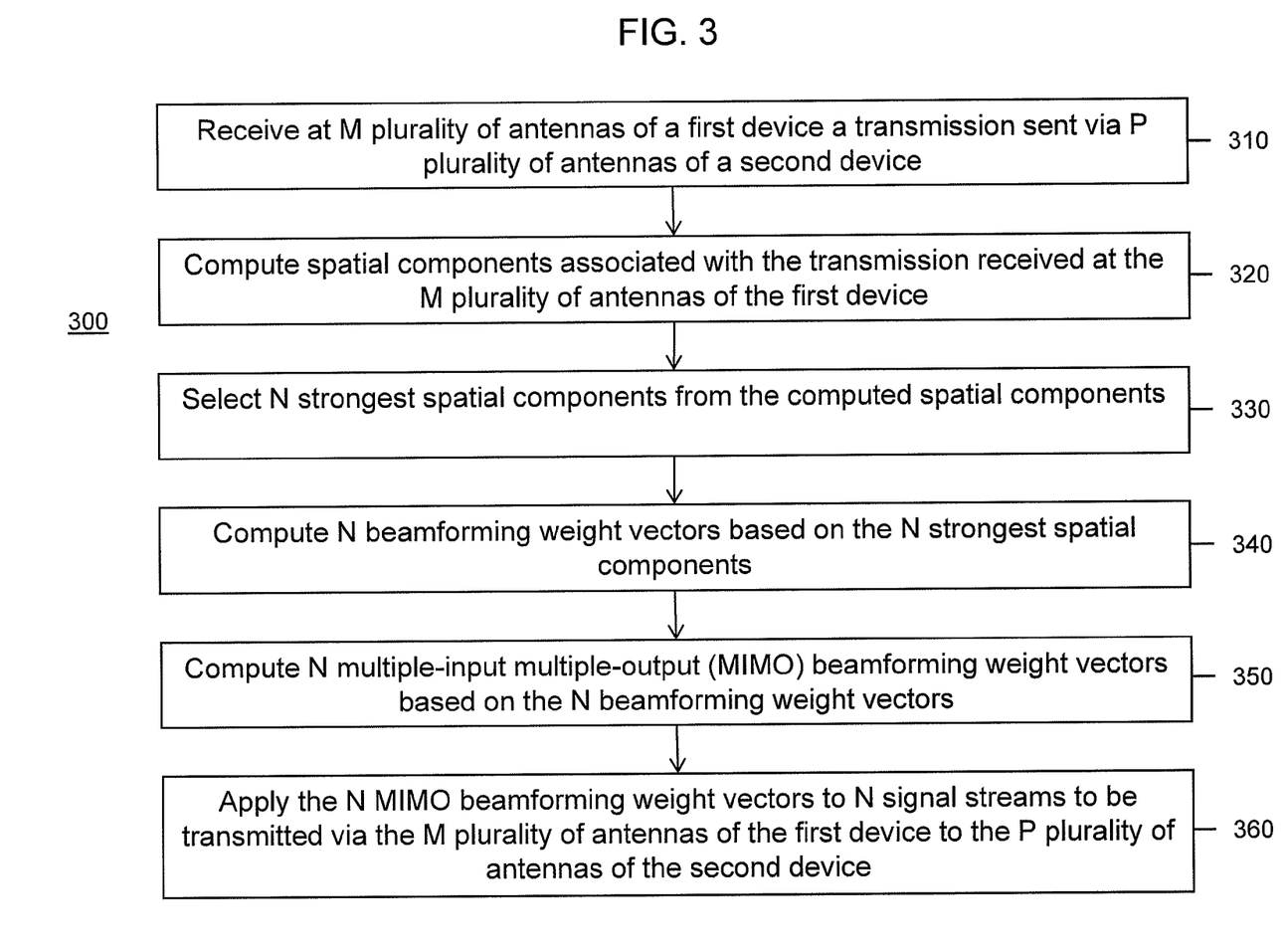
FIG. 3 is an example of a flow chart generally depicting the spatial decomposition and beamforming+MIMO weight vector computation process.

Turning now to FIG. 3, the spatial decomposition and BF+MIMO weight vector computation process 300 is now described. Briefly, the process 300 comprises receiving at M plurality of antennas of a first device a transmission sent via P plurality of antennas of a second device. Spatial components associated with reception of the transmission at the M plurality of antennas are computed. The N strongest spatial components (in magnitude) are selected among the computed spatial components. N beamforming weight vectors are computed based on the N strongest spatial components. N MIMO beamforming weight vectors are then computed based on the N beamforming weight vectors. The N MIMO beamforming weight vectors have dimension M. The N MIMO beamforming weight vectors are applied to the N signal streams to be transmitted via the M plurality of antennas of the first device to the P plurality of antennas of the second device.

The process 300 is now described in more detail. At 310, a transmission sent via P plurality of antennas of a second device is received at the M plurality of antennas of a first device. The received signals at the individual antennas may be represented as $U=\{u_1, u_2 \ldots u_M\}$, where $u_1$ is the signal received at antenna 140(1), $u_2$ is the signal received at antenna 140(2) and so on. The steering vector (or response vector) for the direction of arrival (DOA) at each antenna of the first device is defined as:

$$w_i(\lambda_u, \theta_i) = \begin{bmatrix} 1 & e^{j2\pi \cdot \frac{D}{\lambda_u} sin(\theta_i)} & e^{j2\pi \cdot \frac{2D}{\lambda_u} sin(\theta_i)} & \ldots & e^{j2\pi \cdot \frac{(M-1)D}{\lambda_u} sin(\theta_i)} \end{bmatrix} \quad (1)$$

where $\lambda_u$ is the uplink transmission wavelength, $\theta_i$ is the $i^{th}$ incident or DOA angle, $-90 < \theta_i < 90$, for i=1 to M, and D is the distance between antennas (in a linear antenna array configuration) at the first device. The spatial components from the received signals are first determined, and the spatial components are just the signals received at the first device from different arriving angles.

At 320, spatial components associated with the transmission received at the M plurality of antennas are computed. To do so, in one example the set of waveforms $w_i$ and the received signal U are normalized to produce spatial components F for each $w_i$, such that:

$$F_i = \text{norm}(U \cdot w_i^T), \text{for } i=1 \text{ to } N. \quad (2)$$

where $^T$ denotes the transpose operation.

Then at 330, the strongest N spatial components in magnitude are selected from $F_i$. The strongest N spatial components are designated $i_a$, where a=1 to N. If two or more transmissions are received at 320, then the selection made at 330 is the N strongest spatial components among spatial components computed from the two or more transmissions.

At 340, N beamforming weight vectors are computed based on the selected N strongest spatial components. In one example embodiment, the N beamforming weight vectors may be of the form:

$$w_{i_a}*(\lambda_d, \theta_{i_a}) = \begin{bmatrix} 1 & e^{-j2\pi \cdot \frac{D}{\lambda_d} sin(\theta_{i_a})} & e^{-j2\pi \cdot \frac{2D}{\lambda_d} sin(\theta_{i_a})} & \ldots & e^{-j2\pi \cdot \frac{(M-1)D}{\lambda_d} sin(\theta_{i_a})} \end{bmatrix} \quad (3)$$

where $\lambda_d$ is the downlink wavelength, a=1 to N and * denotes the complex conjugate operation.

Then at 350, the N MIMO beamforming weight vectors are computed based on the N beamforming weight vectors computed at 340. In one example embodiment, a well known eight-point algorithm may be employed. First, covariance matrices $R_1$-$R_N$ are computed using as:

$$R_a = w_{i_a}^{T*}(\lambda_d, \theta_{i_a}) \cdot w_{i_a}(\lambda_d, \theta_{i_a}), \text{for } a=1 \text{ to } N. \quad (4)$$

Once the covariance matrices $R_1$-$R_N$ are computed, the MIMO beamforming weight vectors $W_1$-$W_N$ are computed. For example, the MIMO beamforming weight vectors $W_1$-$W_N$ are computed as the principal eigenvectors of:

$$\left( \sum_{i=2}^{N} \alpha_i \cdot R_i + \beta_1 \cdot I \right)^{-1} \cdot R_1 \cdot W_1 = \lambda \cdot W_1 \quad (5)$$

$$\left( \sum_{i=1, \neq 2}^{N} \alpha_i \cdot R_i + \beta_2 \cdot I \right)^{-1} \cdot R_2 \cdot W_2 = \lambda \cdot W_2$$

...

-continued $$\left( \sum_{i=1, \neq n}^{N} \alpha_i \cdot R_i + \beta_n \cdot I \right)^{-1} \cdot R_n \cdot W_n = \lambda \cdot W_n$$

...

$$\left( \sum_{i=1}^{N-1} \alpha_i \cdot R_i + \beta_N \cdot I \right)^{-1} \cdot R_N \cdot W_N = \lambda \cdot W_N$$

where $\alpha_i$ are scale factors between zero and one, $\beta_i$ are scale factors greater than zero, $\lambda$ is the identity matrix, and is an eigenvalue. The scale factors $\alpha_i$ and $\beta_i$ can be changed dynamically. Other techniques for computing the MIMO beamforming weight vectors from the N strongest spatial components may include precoding, power weighting, or other known methods.

At 360, the N MIMO beamforming weight vectors $W_1$-$W_N$ are applied to the N signal streams to be transmitted via the M plurality of antennas of the first device to the P plurality of antennas of the second device.

Figure 4:
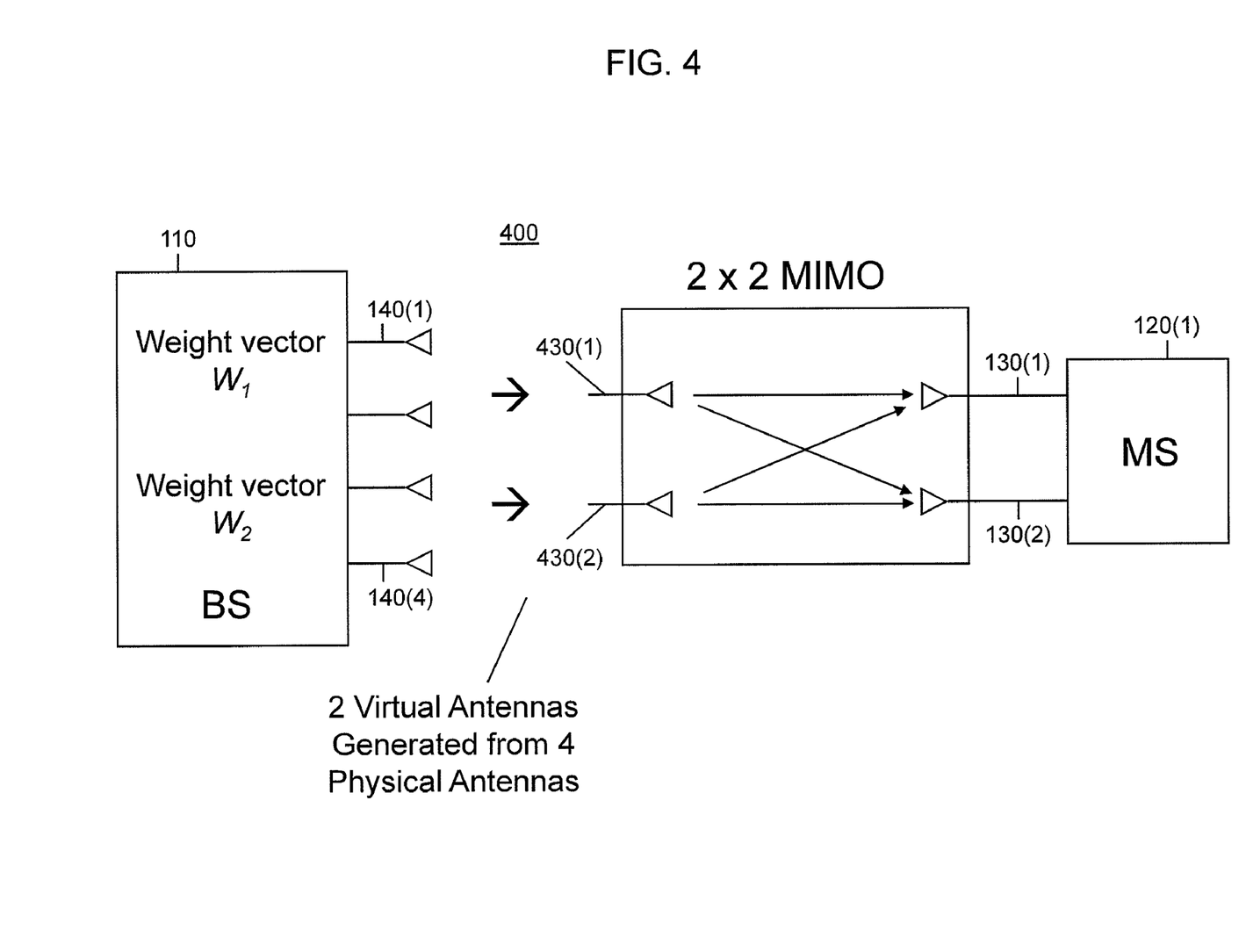
FIG. 4 is a block diagram showing a specific example of a MIMO wireless communication system wherein one device performs the spatial decomposition and beamforming+MIMO weight vector computation process.

From the generalized techniques described above a specific example is given in which a BS has four antennas (M=4) and an MS has two antennas (P=2). Turning to FIG. 4, an example communication link is shown at 400. The BS 110 from FIG. 1 is depicted with four antennas 140(1)-140(4) and is configured to transmit a downlink signal (not shown) to the MS 120(1) with two antennas 130(1) and 130(2). This represents a 4×2 MIMO communication link in which the BS 110 transmits two (N=2, N≦min (M, P)) signal streams via its four antennas 140(1)-140(4) to the MS 120(1). However, the BS 110, as embodied herein, having already spatially decomposed an uplink signal (not shown) has computed 2 MIMO beamforming weight vectors $W_1$ and $W_2$ using the techniques described herein. The MIMO beamforming weight vectors $W_1$ and $W_2$ are applied to two signal streams (not shown) for transmission by the BS 110 to the MS 120(1). Thus, the communication link 400 may be modeled as two "virtual" BS antennas (430(1) and 430(2))×two MS antennas, or 2×2 MIMO. The method of computing MIMO beamforming weight vectors $W_1$ and $W_2$ for the communication link 400 is now described with greater detail.

Figure 5:
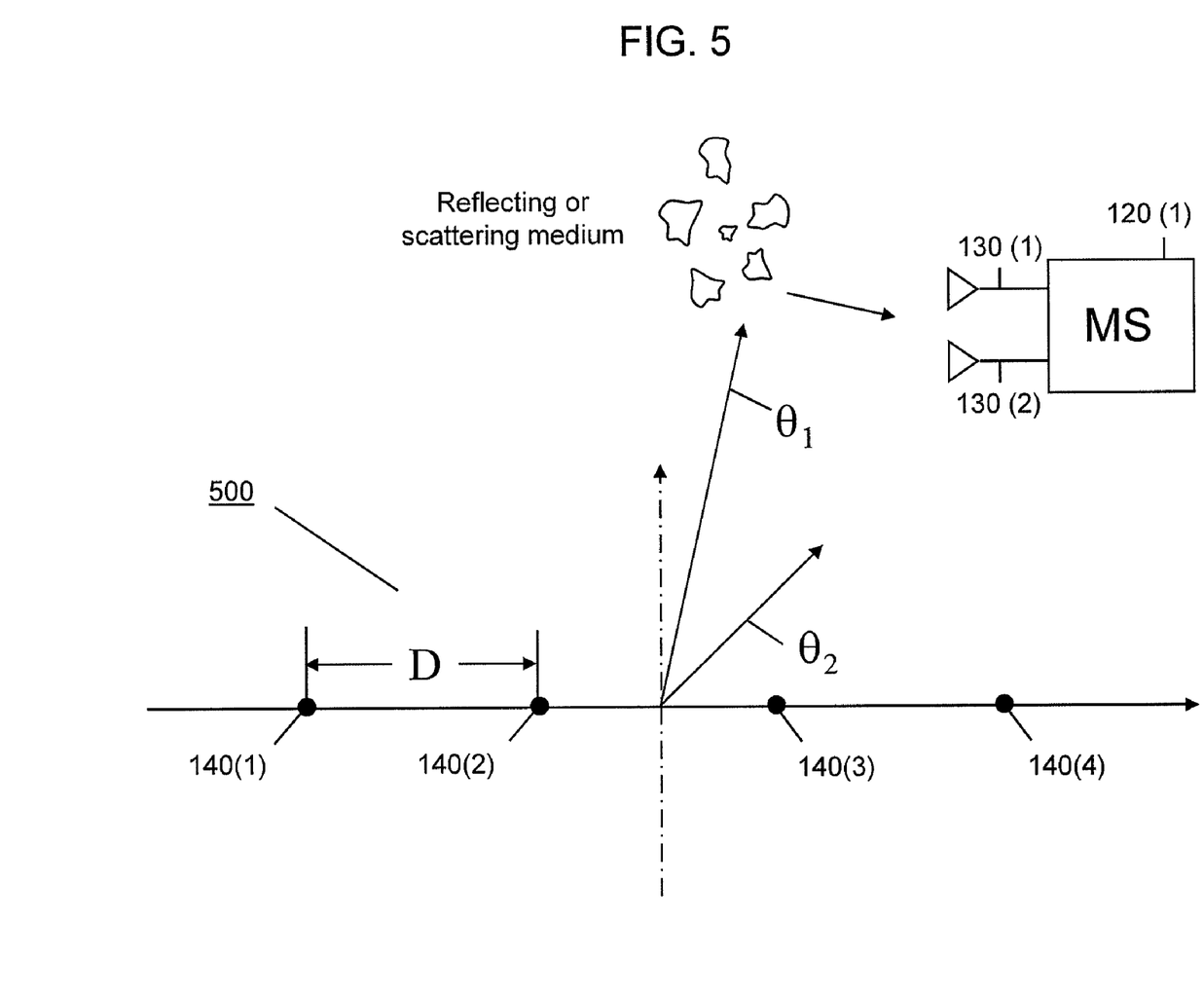
FIG. 5 is diagram showing an example of spatial decomposition at a BS device with a linear antenna array comprising four antennas.

Turning to FIG. 5, the four antennas 140(1)-140(4) of BS 110 from FIG. 4 are depicted as a linear array at reference numeral 500. Each antenna is separated by a distance D. The received uplink signal (not shown) is represented as U={$u_1$, $u_2$, $u_3$, $u_4$}, where $u_1$ is the signal received at antenna 140(1), $u_2$ is the signal received at antenna 140(2) and so on, as described above. The uplink signal is spatially decomposed to compute the incident angles, $\theta_1$ and $\theta_2$, for the transmission received at the antennas 140(1)-140(4) sent via the antennas 130(1) and 130(2) of the MS 120(1).

The incidence angles $\theta_1$ and $\theta_2$ represent the angles of the two strongest spatial components selected from a plurality of spatial components (incidence angles for which are not shown) and are used to compute MIMO beamforming weight vectors $W_1$ and $W_2$. The generalized waveform equation (1) is represented in specific form by equations (6) for a received uplink signal transmitted by antennas 130(1) and 130(2), and received by antennas 140(1)-140(4):

$$w_1(\lambda_u, \theta_1) = \begin{bmatrix} 1 & e^{j2\pi \cdot \frac{D}{\lambda_u} sin(\theta_1)} & e^{j2\pi \cdot \frac{2D}{\lambda_u} sin(\theta_1)} & e^{j2\pi \cdot \frac{3D}{\lambda_u} sin(\theta_1)} \end{bmatrix} \quad (6)$$

-continued $$w_2(\lambda_u, \theta_2) = \begin{bmatrix} 1 & e^{j2\pi \cdot \frac{D}{\lambda_u} sin(\theta_2)} & e^{j2\pi \cdot \frac{2D}{\lambda_u} sin(\theta_2)} & e^{j2\pi \cdot \frac{3D}{\lambda_u} sin(\theta_2)} \end{bmatrix}$$

The first elements of equations (6) are normalized to 1 for the first antenna 140(1) in the antenna array 500. The remaining elements therefore incorporate distance information (D, 2D, and 3D), and angular information, $\theta_1$ and $\theta_2$, relative to the normalized first element for the first antenna 140(1) in the antenna array 500.

In one example, the sets of waveforms $w_1$, $w_2$, and the received signal U are normalized to produce spatial components F for each i, such that:

$$F_i = \text{norm}(U \cdot w_i^T) \text{ for } i=1\text{-}2, \text{since } N=2 \text{ in this example.} \quad (7)$$

Next, the two (N=2) strongest spatial components are selected from $F_i$. The two strongest spatial components are designated $i_1$ and $i_2$. The two strongest spatial components $i_1$ and $i_2$ are used to calculate the incidence angles $\theta_1$ and $\theta_2$ depicted in FIG. 5. In one example embodiment, the technique for computing $\theta_1$ and $\theta_2$ may employ a Fourier transform. The two beamforming weight vectors are computed based on the selected two strongest spatial components $i_1$ and $i_2$. In one example embodiment, the two beamforming weight vectors may be of the form:

$$w_{1^*}(\lambda_d, \theta_1) = \begin{bmatrix} 1 & e^{-j2\pi \cdot \frac{D}{\lambda_d} sin(\theta_1)} & e^{-j2\pi \cdot \frac{2D}{\lambda_d} sin(\theta_1)} & e^{-j2\pi \cdot \frac{3D}{\lambda_d} sin(\theta_1)} \end{bmatrix}$$

$$w_{2^*}(\lambda_d, \theta_2) = \begin{bmatrix} 1 & e^{-j2\pi \cdot \frac{D}{\lambda_d} sin(\theta_2)} & e^{-j2\pi \cdot \frac{2D}{\lambda_d} sin(\theta_2)} & e^{-j2\pi \cdot \frac{3D}{\lambda_d} sin(\theta_2)} \end{bmatrix} \quad (8)$$

where $\lambda_d$ is the downlink wavelength. The first elements of equations (8) are normalized to 1 with respect to the first antenna 140(1) in the antenna array 500. The remaining elements incorporate distance information (D, 2D, and 3D), and angular information, $\theta_1$ and $\theta_2$.

Two MIMO beamforming weight vectors are computed based on the two beamforming weight vectors computed using equations (8). In one example embodiment, the eight-point algorithm may be employed. First, covariance matrices $R_1$ and $R_2$ are computed using equations (9):

$$R_1 = w_1^{T*}(\lambda_d, \theta_1) \cdot w_1(\lambda_d, \theta_1)$$

$$R_2 = w_2^{T*}(\lambda_d, \theta_2) \cdot w_2(\lambda_d, \theta_2) \quad (9)$$

Once the covariance matrices $R_1$ and $R_2$ are computed, the MIMO beamforming weight vectors $W_1$ and $W_2$ are computed. For example, the MIMO beamforming weight vectors $W_1$ and $W_2$ are computed as the principal eigenvectors of equations (10):

$$(\alpha_2 \cdot R_2 + \beta_1 \cdot I)^{-1} \cdot R_1 \cdot W_1 = \lambda \cdot W_1$$

$$(\beta_1 \cdot R_1 + \beta_2 \cdot I)^{-1} \cdot R_2 \cdot W_2 = \lambda \cdot W_2 \quad (10)$$

where $\alpha_1$ and $\alpha_2$ are scale factors between zero and one, $\beta_1$, and $\beta_2$ are scale factors greater than zero, I is the identity matrix and $\lambda$ is an eigenvalue.

The two MIMO weight vectors $W_1$-$W_N$ are applied to the two signal streams to be transmitted via the four antennas 140(1)-140(4) of BS 110 to two antennas 130(1) and 130(2) of the MS 120(1).

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   receiving at M plurality of antennas of a first device a transmission sent via P plurality of antennas of a second device;
   computing spatial components associated with reception of the transmission at the M plurality of antennas of the first device;
   selecting N spatial components that are strongest among the computed spatial components;
   computing N beamforming weight vectors based on the N strongest spatial components;
   computing N multiple-input multiple-output (MIMO) beamforming weight vectors based on the N beamforming weight vectors; and
   applying the N MIMO beamforming weight vectors to N signal streams to be transmitted via the M plurality of antennas of the first device to the P plurality of antennas of the second device.

2. The method of claim 1, wherein receiving comprises receiving two or more transmissions at the plurality of antennas of the first device sent via the P plurality of antennas of the second device, and wherein selecting comprises selecting the N strongest spatial components among spatial components computed from the two or more transmissions.

3. The method of claim 1, wherein computing the N beamforming weight vectors comprises:
   computing a direction of arrival for each of the N strongest spatial components; and
   deriving the N beamforming weight vectors based on the direction of arrival for each of the N strongest spatial components.

4. The method of claim 3, wherein computing the N MIMO beamforming weight vectors comprises computing N covariance matrices from the N beamforming weight vectors, and computing the N MIMO beamforming weight vectors from the N covariance matrices.

5. The method of claim 4, wherein computing the N MIMO beamforming weight vectors further comprises computing respective N MIMO beamforming weight vectors from a principal eigenvector of a matrix quantity that is based on the N covariance matrices.

6. The method of claim 4, wherein computing the N MIMO beamforming weight vectors comprises computing the principal eigenvectors of:

$$\left( \sum_{i=2}^{N} \alpha_i \cdot R_i + \beta_1 \cdot I \right)^{-1} \cdot R_1 \cdot W_1 = \lambda \cdot W_1$$

$$\left( \sum_{i=1, \neq 2}^{N} \alpha_i \cdot R_i + \beta_2 \cdot I \right)^{-1} \cdot R_2 \cdot W_2 = \lambda \cdot W_2$$

...

$$\left( \sum_{i=1, \neq n}^{N} \alpha_i \cdot R_i + \beta_n \cdot I \right)^{-1} \cdot R_n \cdot W_n = \lambda \cdot W_n$$

...

-continued $$\left(\sum_{i=1}^{N-1} \alpha_i \cdot R_i + \beta_N \cdot I\right)^{-1} \cdot R_N \cdot W_N = \lambda \cdot W_N$$

where $\alpha_i$ are scale factors between zero and one, $\beta_i$ are scale factors greater than zero, I is the identity matrix, $\lambda$ is an eigenvalue, $R_1$-$R_N$ are the N covariance matrices and $W_1$-$W_N$ are the N MIMO beamforming weight vectors.

7. An apparatus comprising:
M plurality of antennas;
a receiver configured to receive a transmission detected by the M plurality of antennas that was sent via P plurality of antennas of another device; and
a controller coupled to the receiver, wherein the controller is configured to:
   compute spatial components associated with reception of the transmission at the M plurality of antennas;
   select N spatial components that are strongest among the computed spatial components;
   compute N beamforming weight vectors based on the N strongest spatial components;
   compute N MIMO beamforming weight vectors based on the N beamforming weight vectors; and
   apply the N MIMO beamforming weight vectors to N signal streams to be transmitted via the M plurality of antennas of the first device to the P plurality of antennas of the other device.

8. The apparatus of claim 7, wherein the controller is configured to compute spatial components associated with reception of two or more transmissions at the M plurality of antennas of the first device sent via the P plurality of antennas of the second device, and wherein the controller is further configured to select the N strongest spatial components among spatial components computed from the two or more transmissions.

9. The apparatus of claim 7, wherein the controller is configured to compute the N beamforming weight vectors by computing a direction of arrival for each of the N strongest spatial components and deriving the N beamforming weight vectors based on the direction of arrival for each of the N strongest spatial components.

10. The apparatus of claim 9, wherein the controller is configured to compute the N MIMO beamforming weight vectors by computing N covariance matrices from the N beamforming weight vectors, and computing the N MIMO beamforming weight vectors from the N covariance matrices.

11. The apparatus of claim 10, wherein the controller is further configured to compute the N MIMO beamforming weight vectors by computing respective N MIMO beamforming weight vectors from a principal eigenvector of a matrix quantity that is based on the N covariance matrices.

12. The apparatus of claim 10, wherein the controller is configured to compute the N MIMO beamforming weight vectors by computing the principal eigenvectors of:

$$\left(\sum_{i=2}^{N} \alpha_i \cdot R_i + \beta_1 \cdot I\right)^{-1} \cdot R_1 \cdot W_1 = \lambda \cdot W_1$$

$$\left(\sum_{i=1,\neq 2}^{N} \alpha_i \cdot R_i + \beta_2 \cdot I\right)^{-1} \cdot R_2 \cdot W_2 = \lambda \cdot W_2$$

...

$$\left(\sum_{i=1,\neq n}^{N} \alpha_i \cdot R_i + \beta_n \cdot I\right)^{-1} \cdot R_n \cdot W_n = \lambda \cdot W_n$$

...

$$\left(\sum_{i=1}^{N-1} \alpha_i \cdot R_i + \beta_N \cdot I\right)^{-1} \cdot R_N \cdot W_N = \lambda \cdot W_N$$

where $\alpha_i$ are scale factors between zero and one, $\beta_i$ are scale factors greater than zero, I is the identity matrix, $\lambda$ is an eigenvalue, $R_1$-$R_N$ are the N covariance matrices and $W_1$-$W_N$ are the N MIMO beamforming weight vectors.

13. A tangible memory storing instructions for execution by a processor, and when executed by the processor, cause the processor to:
   compute spatial components associated with the reception of a transmission at M plurality of antennas of a first device that is sent via P plurality of antennas of a second device;
   select N spatial components that are strongest among the computed spatial components;
   compute N beamforming weight vectors based on the N strongest spatial components;
   compute N MIMO beamforming weight vectors based on the N beamforming weight vectors; and
   apply the N MIMO beamforming weight vectors to N signal streams to be transmitted via the M plurality of antennas of the first device to the P plurality of antennas of the second device.

14. The tangible memory media of claim 13, wherein the instructions that cause the processor to compute spatial components comprises instructions that causes the processor to compute spatial components of two or more transmissions received at the plurality of antennas of the first device sent via the P plurality of antennas of the second device, and wherein the instructions that causes the processor to select comprise instructions that cause the processor to select the N strongest spatial components among spatial components computed from the two or more transmissions.

15. The tangible memory media of claim 13, wherein the instructions that cause the processor to compute the N beamforming weight vectors comprise instructions that cause the processor to compute a direction of arrival for each of the N strongest spatial components and instructions that cause the processor to derive the N beamforming weight vectors based on the direction of arrival for each of the N strongest spatial components.

16. The tangible memory media of claim 15, wherein the instructions that cause the processor to compute the N MIMO beamforming weight vectors comprise instructions that cause the processor to compute N covariance matrices from the N beamforming weight vectors and instructions that cause the processor to compute the N MIMO beamforming weight vectors based on the N covariance matrices.

17. The tangible memory of claim 16, wherein the instructions that cause the processor to compute the N MIMO beamforming weight vectors further comprise instructions that cause the processor to compute respective N MIMO beamforming weight vectors from a principal eigenvector of a matrix quantity that is based on the N covariance matrices.

18. The tangible memory of claim 16, wherein the instructions that cause the processor to compute the N MIMO beamforming weight vectors comprise instructions that cause the processor to compute the principal eigenvectors of:

$$\left(\sum_{i=2}^{N} \alpha_i \cdot R_i + \beta_1 \cdot I\right)^{-1} \cdot R_1 \cdot W_1 = \lambda \cdot W_1$$

$$\left(\sum_{i=1, \neq 2}^{N} \alpha_i \cdot R_i + \beta_2 \cdot I\right)^{-1} \cdot R_2 \cdot W_2 = \lambda \cdot W_2$$

$$\cdots$$

$$\left(\sum_{i=1, \neq n}^{N} \alpha_i \cdot R_i + \beta_n \cdot I\right)^{-1} \cdot R_n \cdot W_n = \lambda \cdot W_n$$

$$\cdots$$

-continued $$\left(\sum_{i=1}^{N-1} \alpha_i \cdot R_i + \beta_N \cdot I\right)^{-1} \cdot R_N \cdot W_N = \lambda \cdot W_N$$

where $\alpha_i$ are scale factors between zero and one, $\beta_i$ are scale factors greater than zero, I is the identity matrix, $\lambda$ is an eigenvalue, $R_1$-$R_N$ are the N covariance matrices and $W_1$-$W_N$ are the N MIMO beamforming weight vectors.

19. The tangible memory of claim 13, wherein the instructions stored in the tangible memory are for execution by the processor in the first device.

\* \* \* \* \*